United States Patent
Krisko et al.

(10) Patent No.: US 6,292,302 B1
(45) Date of Patent: Sep. 18, 2001

(54) HEAT-TREATABLE DICHROIC MIRRORS

(75) Inventors: Annette J. Krisko, Prairie du Sac; Scott A. Maxwell, Lone Rock, both of WI (US)

(73) Assignee: Cardinal Glass Industries, Inc., Minnetonka, MN (US)

( * ) Notice: Subject to any disclaimer, the term of this patent is extended or adjusted under 35 U.S.C. 154(b) by 0 days.

(21) Appl. No.: 09/522,981

(22) Filed: Mar. 10, 2000

Related U.S. Application Data

(63) Continuation-in-part of application No. 09/185,305, filed on Nov. 3, 1998.

(51) Int. Cl.$^7$ .............................. G02B 27/14; G02B 1/10; G02B 5/08
(52) U.S. Cl. ...................... 359/634; 359/839; 359/580
(58) Field of Search ................... 359/634, 636, 359/580, 584, 585, 588, 589, 583, 839

(56) References Cited

U.S. PATENT DOCUMENTS

| | | | |
|---|---|---|---|
| 3,962,062 | 6/1976 | Ingrey | 204/192 |
| 4,098,956 | 7/1978 | Blickensderfer et al. | 126/908 |
| 4,166,018 | 8/1979 | Chapin | 204/192 |
| 4,780,372 | 10/1988 | Tracy et al. | 359/883 |
| 4,861,669 | 8/1989 | Gillery | 428/434 |
| 4,938,857 | 7/1990 | Gillery | 204/192 |
| 4,963,012 | 10/1990 | Tracy et al. | 350/641 |
| 5,014,167 | 5/1991 | Roberts | 362/83.1 |
| 5,085,926 | 2/1992 | Iida et al. | 428/216 |
| 5,170,291 | 12/1992 | Szczyrbowski et al. | 359/580 |
| 5,207,492 | 5/1993 | Roberts | 362/30 |
| 5,242,560 | 9/1993 | Lingle et al. | 204/192.27 |
| 5,279,722 | 1/1994 | Szczyrbowski et al. | 204/192 |
| 5,342,675 | 8/1994 | Kobayashi et al. | 428/216 |
| 5,355,284 | 10/1994 | Roberts | 362/30 |
| 5,361,190 | 11/1994 | Roberts et al. | 362/61 |
| 5,481,409 | 1/1996 | Roberts | 359/839 |
| 5,535,056 | 7/1996 | Caskey et al. | 359/603 |
| 5,543,229 | 8/1996 | Ohsuki et al. | 428/432 |
| 5,584,902 | 12/1996 | Hartig et al. | 65/32.4 |
| 5,705,278 | 1/1998 | Gillery et al. | 428/433 |
| 5,728,456 | 3/1998 | Adair et al. | 428/216 |
| 5,751,489 | 5/1998 | Caskey et al. | 359/603 |
| 5,788,357 | 8/1998 | Muth et al. | 362/83.1 |
| 5,800,933 | 9/1998 | Hartig et al. | 428/622 |
| 5,808,778 | 9/1998 | Bauer et al. | 359/267 |
| 6,064,525 | 5/2000 | Depauw | 359/583 |
| 6,142,642 | * 11/2000 | Krisko et al. | 359/883 |

FOREIGN PATENT DOCUMENTS

| | | |
|---|---|---|
| 0 482 933 | 10/1991 | (EP) . |
| WO 9725451 | 7/1997 | (WO) . |

\* cited by examiner

*Primary Examiner*—Ricky Mack
*Assistant Examiner*—Saud Seyrafi
(74) *Attorney, Agent, or Firm*—Fredrikson & Byron, P.A.

(57) ABSTRACT

A heat-treatable dichroic mirror, comprising a transparent substrate having a glass transition temperature in the range of 650–800° C., and a plurality of sputtered films carried on said substrate and forming at least two pairs of contiguous films in which the films of each pair have disparate refractive indices differing by at least about 0.2 so as to provide between them a reflective interface. The films include an oxide of a metal such as titanium, a second film comprising an oxidizable metal or semi-metal such as silicon, and a protective overcoat of a thickness and composition sufficient to substantially prevent permeation of oxygen therethrough when heat treated at said glass transition temperature. The mirror, after said heat treatment, exhibits a transmittance of at least 24% in the wavelength range of 550–650 nm, a reflectance of at least 45%, and a haze of not greater than about 1%.

19 Claims, 2 Drawing Sheets

HEAT-TREATABLE DICHROIC MIRRORS

RELATED APPLICATIONS

This application is a continuation-in-part of U.S. Ser. No. 09/185,305, filed Nov. 3, 1998, the entire disclosure of which is incorporated herein by reference.

FIELD OF THE INVENTION

The invention relates to mirrors, and particularly to dichroic mirrors that are formed utilizing flat substrates such as glass and which subsequently are subjected to a heat treatment to temper or bend the mirror.

BACKGROUND OF THE INVENTION

Dichroic mirrors, that is mirrors that exhibit different colors in reflection and transmission, can be employed as rearview mirrors for motor vehicles and for other purposes. A mirror can be manufactured by applying a reflective coating to a glass substrate using magnetron sputtering techniques of the type described in Chapin, U.S. Pat. No. 4,166,018. Although a reflective metal such as chromium or silver may be employed as a reflective film for standard mirrors, dichroic mirrors commonly employ two contiguous films or films of materials having different refractive indices, and reflection occurs at the interface of these films.

Dichroic mirror assemblies that are used for rearview mirrors for vehicles may be provided with light sources such as light emitting diodes ("LEDs") carried in housings forward of the mirror so that light from the LEDs is transmitted rearwardly through the mirror. Examples of such mirror assemblies are found in Roberts, U.S. Pat. Nos. 5,481,409, 5,355,284 and 5,207,492, and Roberts et al. U.S. Pat. No 5,361,190.

Substantial optical performance is required of these dichroic mirrors, inasmuch as the mirrors must be highly reflective so that a motor vehicle operator can clearly see what is happening near the rear of the vehicle. Transmittance, of course, is important so that sufficient LED light passes through the mirror without the necessity of using extremely powerful and hence expensive LEDs. LEDs may signal a variety of events, both to the driver and to following traffic. LEDs may signal when doors have been opened, when brakes are applied, etc. Although some LED signals need only be bright enough to be readily perceived by a motor vehicle operator, others should be sufficiently bright so as to be perceived by vehicles following the vehicle. For example, it is difficult for following traffic to see when the side door of a passenger or cargo van has been opened. The appearance of a bright LED signal in the van's exterior rearview mirror can signal to following traffic that the door is open and passengers may be about to exit.

When curved mirrors are manufactured using magnetron sputtering processes, the glass substrates for the mirrors may first be bent to the desired shape, and then can be placed on an appropriate carrier and coated by magnetron sputtering. Due to curvature of the substrates, the reflective coatings that are produced may not be precisely uniform. The manufacturing process itself is tedious and time-consuming inasmuch as it requires multiple small glass substrates to be laid by hand upon a carrier that passes through a magnetron sputtering apparatus and requires each of the resulting individual mirror pieces to be removed by hand from the carrier sheet once the sputtering operation is completed.

It would be desirable to provide a dichroic mirror utilizing a flat glass sheet as the substrate, and thereafter bending and cutting the mirror as desired, with the mirror retaining good reflectance so that objects to the rear of the driver can be seen and good transmittance so LED signals can be easily perceived through the mirror. Unfortunately, the heat bending process, which may require temperatures ranging from about 650° C. to about 800° C., can produce undesired changes in commercially available dichroic mirrors. Reflectivity of such mirrors often is greatly decreased, and the development of haze may also present a problem. Haze in excess of 1%, in particular, should be avoided.

SUMMARY OF THE INVENTION

The present invention provides a dichroic mirror that can be subjected to substantial temperatures during tempering or bending and which, after such treatment exhibits excellent reflectance and transmittance properties. In one embodiment, the invention relates to a heat treatable dichroic mirror that comprises a transparent substrate having a glass transition temperature in the range of 650–800° C. and which carries a plurality of sputtered-on films. The films form at least two and preferably at least three pairs of contiguous films, the films of each pair having disparate refractive indices (that is, indices of refraction differing by at least about 0.2 and preferably by at least about 0.4) so as to provide between them a reflective interface. Each film may be a member of one or two pairs of contiguous films having disparate indices of refraction.

A first film, which is a member of a contiguous film pair having disparate refractive indices, comprises an oxide of a metal, for example, an oxide of titanium. A second film further from the substrate than the first film comprises an oxidizable film, preferably of a metal or semi-metal such as silicon, and is also a member of a contiguous film pair having disparate refractive indices. The first and second films may be contiguous, or may have between them a third, oxygen barrier film forming a contiguous, disparate index film pair with at least one of and preferably both of the first and second films so as to provide reflective interfaces with the latter films and to restrain permeation of oxygen through it to thus protect the second film from oxidation.

A fourth protective overcoat film is provided further from the substrate than the second film and of a thickness and composition sufficient to substantially prevent penetration of oxygen therethrough during heat treatment at the glass transition temperature and to provide protection against physical damage to the films. The third and fourth films preferably sandwich between them and are contiguous to the second film.

As a fifth film, a base film may be positioned between the substrate and the first film. The fifth or base film desirably is immediately beneath (that is, contiguous to) the first film and has an index of refraction substantially different from the index of refraction of the first film. For example, if the first film is titanium oxide which has an index of refraction of about 2.4, the base film may be silicon nitride or zinc oxide, each of which has an index of refraction of about 2.0. As with the first and second films, the difference in indices of refraction between the fifth base film and the first contiguous film provides a refractive interface that contributes to reflectivity of the mirror. Moreover, the overcoat film desirably is contiguous to the second film and has an index of refraction substantially different from that of the second film The resulting dichroic mirror, after heat treatment, exhibits a transmittance of at least 24% and preferably at least 35%, and a reflectance of at least 45%. The haze desirably is not greater than about 1% and preferably not greater than 0.5%. Of particular importance is the protective overcoat film, as it is this film that protects the oxidizable element from aid and substantially prevents oxidation of that film so that reflectance is not significantly altered by the heat treatment.

Desirably, the first film includes an element or compound that is different from the metal oxide of this film and which may be thought of as an impurity. The impurity may be a compound of the metal of that film, and is present in an amount sufficient to retard haze formation in that film upon heat treatment. The mol ratio of the different material to the oxide of that metal does not exceed 0.1 and preferably ranges from about 0.001 to 0.1.

Thus, in another embodiment, the invention involves a method of making a dichroic mirror that comprises magnetron sputter coating a plurality of sequential films upon a transparent substrate having a glass transition temperature in the range of 650–800° C., the films including at least two and preferably at least three pairs of contiguous films, the films of each pair having disparate refractive indices (that is, indices of refraction differing by at least about 0.2 and preferably by at least about 0.4) so as to provide between them a reflective interface. Each film may be a member of one or two pairs of contiguous films having disparate indices of refraction. A first film, which is a member of a contiguous film pair having disparate refractive indices, comprises an oxide of a metal, for example, an oxide of titanium. Over the first film is deposited a second oxidizable film comprising an oxidizable element, such as silicon. A protective overcoat of a thickness and composition sufficient to substantially prevent penetration of oxygen therethrough is deposited over the second film.

The method includes the step of incorporating in the first film an element or compound that is different from the metal oxide of this film and which may be thought of as an impurity. The impurity may be a compound of the metal of that film, and is present in an amount sufficient to retard haze formation in that film upon heat treatment. The mol ratio of the different material to the oxide of that metal does not exceed 0.1 and preferably ranges from about 0.001 to 0.1. The impurity preferably is incorporated in the metal oxide film as the latter is deposited, and may be derived from an additional gas such as nitrogen present in the sputtering atmosphere. In a preferred embodiment, the metal oxide is titanium oxide, and the different compound is a nitrogen compound of titanium or oxygen, such as titanium nitride. In its preferred embodiment, the method includes the step of sputter depositing the first film in an atmosphere that not only enables the oxide of the metal to be deposited, but also enables the other compound to be co-deposited. Preferably, the sputtering atmosphere includes nitrogen in an amount not exceeding about 10 mol percent.

DETAILED DESCRIPTION OF THE PREFERRED EMBODIMENT

Figure 1:
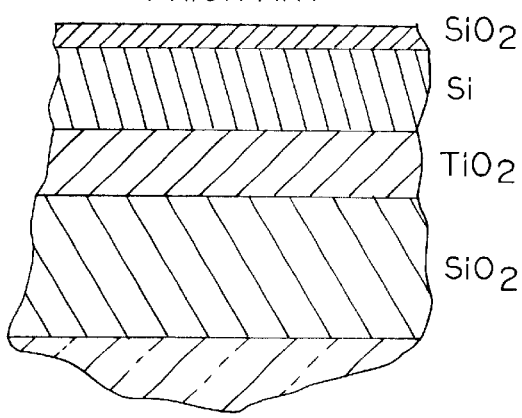
FIG. 1 is a broken-away, cross-sectional schematic view of a prior art dichroic mirror.

FIG. 1 shows a dichroic mirror currently in use and available from Verreries Hirtz SA. The mirror is flat, and is understood to consist of four sequential films upon a glass substrate. The film nearest to the glass substrate is tin oxide having a thickness of about 790 Å, following which is a titanium dioxide film (350 Å), a silicon film (190 Å), and a top silicon dioxide film (50 Å). It is not known whether the outer film of silicon dioxide actually is separately applied or whether it is formed through oxidation of the elemental silicon film through exposure to air. The latter is believed to be the mechanism, however. The reflectance of the commercially available mirror is 50%, its transmittance (Illuminant D65) is 33%, and its haze factor is 0.40. As used herein, reflectance refers to hemispherical reflectance (as measured using a reflectometer and integrating sphere over the wavelength range of 200 to 2600 nm).

The commercially available mirror of FIG. 1 was subjected to bending at glass softening temperatures. After bending, the reflectance of the mirror had been reduced to 36%, which is unacceptable for dichroic mirrors to be used in automotive rearview mirror products. The transmittance of the mirror increased to 54%.

Figure 2:
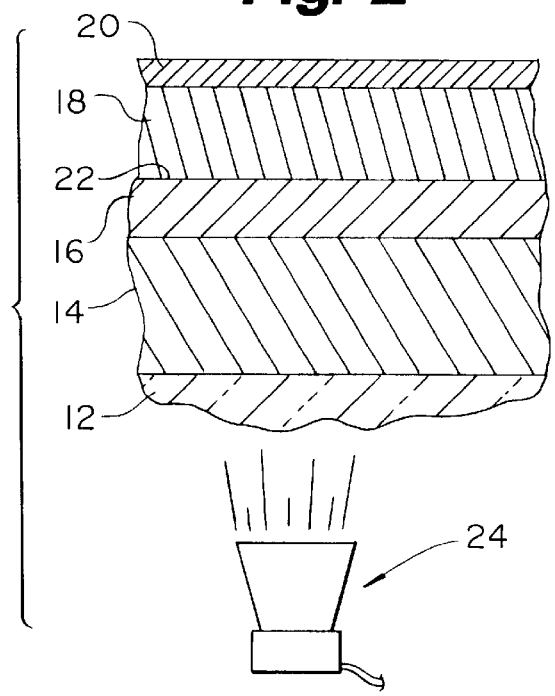
FIG. 2 is a schematic, broken-away view of a dichroic mirror of the invention.
Figure 4:
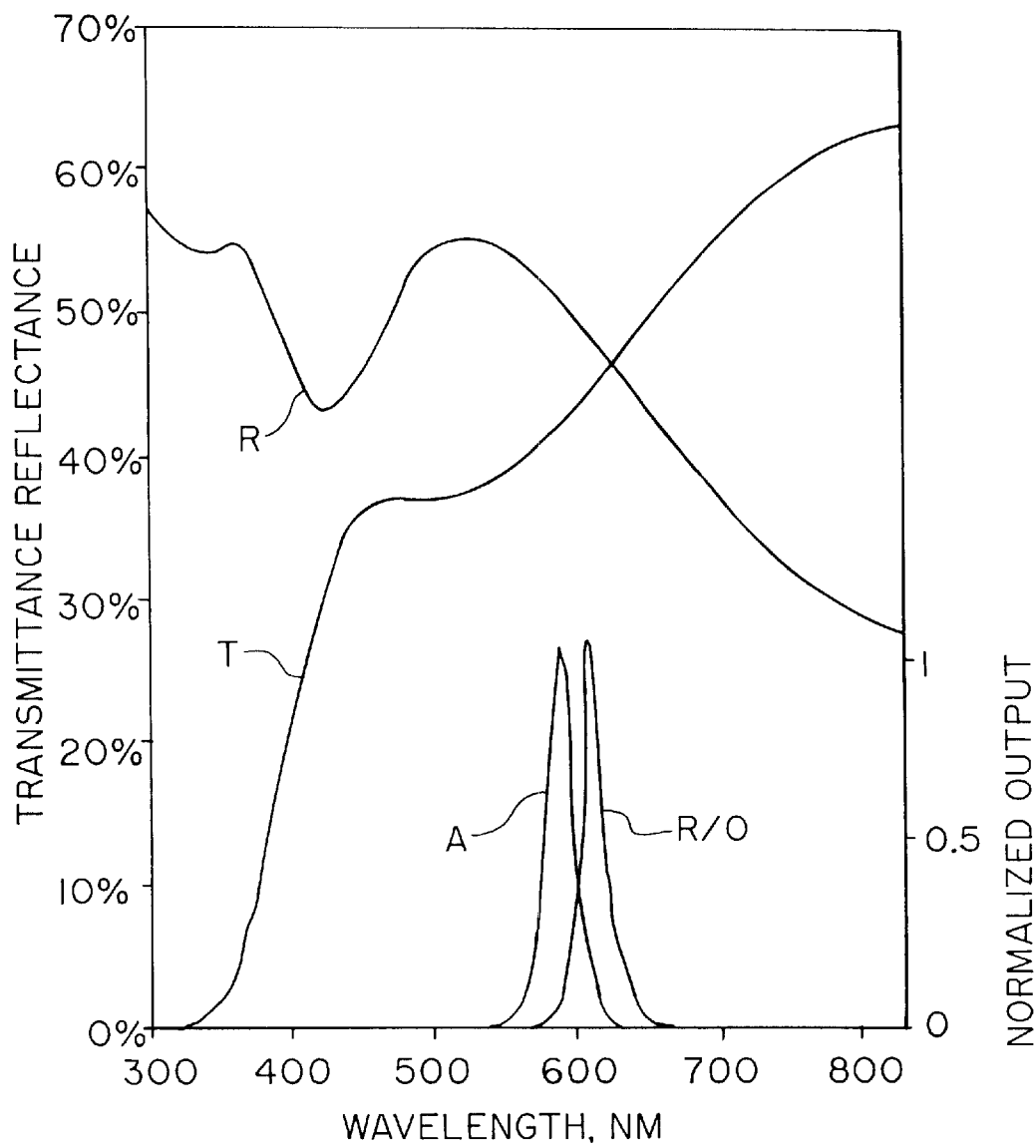
FIG. 4 is a graph of transmittance and reflectance of a mirror of the invention as a function of wavelength, together with a superimposed graph of LED output versus wavelength.

Referring now to FIG. 2, this mirror is mounted in a mirror frame and has its coated side facing toward the user, e.g. toward the rear to face the vehicle operator. Reflectance, accordingly, refers to the reflection from the coated side with little reflected light passing through the glass substrate, and transmissivity refers to the transmission of light from one or more LEDs positioned forward of the mirror. An LED is shown schematically in FIG. 2 as 24, the LED being positioned forwardly of the mirror 10. Accordingly, transmissivity of dichroic mirrors of the invention is important primarily at the wavelengths of light emitted by the LEDs. FIG. 4 shows the light output of amber light emitted by an LED (curve A) having peak emissivity at about 596 nm and of red-orange light emitted by another LED (curve R/O) having peak emissivity at about 615 nm. From the curves A and R/O (having reference to the right hand scale on the graph), it can be seen that light output from these LED's occurs in a wavelength range of about 550 nm to 650 nm. Thus, in the preferred embodiment, transmittance is reasonably high—at least 24% and preferably at least 35%—in this wavelength range.

The mirror of FIG. 2 includes a glass substrate is shown at 12, and a base film 14 is sputtered onto the glass substrate surface. The base film 14 to increase overall reflectance of the mirror and to permit adjustment in color to desirably obtain color neutrality in reflectance. In one useful embodiment, the base film 14 comprises zinc oxide sputtered onto the glass from a zinc target in an oxygen-containing atmosphere. In a particularly preferred embodiment surprisingly found to yield better overall performance, the base film 14 instead comprises silicon nitride sputtered onto the glass from a silicon target in a nitrogen-containing atmosphere.

Sputtered onto the base film 14 is a metal oxide film 16, followed by an oxidizable element-containing film 18, followed in turn by an overcoat 20. The indices of refraction of the films 16 and 18, shown as a contiguous film pair, are sufficiently disparate so that the interface 22 between the two films becomes a reflecting surface. That is, the indices preferably differ by at least 0.2 (that is, by at least about 10%) and preferably differ by at least about 0.4 (that is, by at least about 20%). Film 20 has as its primary purpose the protection of the film 18 from becoming oxidized when subjected to the elevated temperatures employed in heat bending of glass articles. Oxidation of the film 18 would cause substantial reduction in the reflectivity of the mirror, and oxidation of this film hence should be avoided.

Base film 14 may be of any dielectric material, including zinc oxide, tin oxide, niobium oxide, silicon nitride, bismuth oxide, aluminum oxide, and oxides or nitrides of alloys of these metals. Zinc oxide and oxides of zinc alloys, such as zinc/tin oxide, are useful in that they are in general easy and relatively inexpensive to sputter at significant thicknesses. In a preferred embodiment, though, the base film 14 is formed of silicon nitride. Quite surprisingly, it has been found that dichroic mirrors having a silicon nitride base film are much more durable than comparable mirrors with a zinc oxide base films (as discussed later). The silicon nitride base coat may be sputtered onto the cleaned glass substrate surface using magnetron sputtering equipment of the type commercially available from Airco, Inc.

Magnetron sputtering is described in Chapin, U.S. Pat. No. 4,166,018, the teaching of which is incorporated by reference. Magnetron sputtering involves transporting a glass substrate through a series of low pressure zones in which the various films that make up the film stack are sequentially applied. Metallic films are sputtered from metallic sources or "targets" beneath which the glass substrates are conveyed. A metal film may be formed by sputtering from a metal target in an inert gas atmosphere such as argon. Other films may be formed by reactive sputtering. When depositing a metal oxide film such as zinc oxide from a metal (e.g., zinc) target in a reactive atmosphere containing oxygen, whereas a nitride film such as silicon nitride may be sputtered utilizing a silicon target in a reactive atmosphere containing nitrogen gas. The thickness of films that are deposited may be controlled by varying the speed of the glass substrate through a coating compartment, by varying the power and sputtering rate, and, of course, by varying the number of compartments in which identical films are applied.

Accordingly, if the base film 14 is to be formed of zinc oxide, it may be applied using a metallic zinc target in a reactive atmosphere containing oxygen gas. Zinc oxide having a thickness in the range of about 800 Å to about 1300 Å is preferred, and a zinc oxide film having a thickness of about 1095 Å has given acceptable results. If the more preferred silicon nitride is instead employed, this base film 14 may be applied using a silicon target in a reactive atmosphere containing nitrogen gas. Silicon nitride having a thickness in the range of about 1000 Å to about 1500 Å is preferred, and a silicon nitride film having a thickness of between 1100 Å and 1400 Å has given acceptable results.

Film 16, which is different from film 14 and which preferably forms with the base film 14 a contiguous film pair having disparate refractive indices, comprises an oxide of a metal such as titanium, zinc, niobium, tin and bismuth, with titanium oxide being preferred. To retard the formation of haze in this film, it is desired to incorporate in this film a small amount of a different material, which may be thought of as an impurity. Nitrogen is preferred for this purpose, and is readily incorporated in the oxide film by sputtering the metal of that film in an atmosphere that contains a small amount of nitrogen, i.e., not more than about 10 mole percent of nitrogen. In this manner, a titanium oxide film containing a small amount of nitrogen can be produced by sputtering a titanium target in an atmosphere containing, as reactive gasses, a relatively large quantity of oxygen and a relatively small quantity of nitrogen. Desirably, the target is of titanium oxide that is substoichiometric in oxygen. Targets of this type are described in International Application WO 97/25451, published Jul. 17, 1997, the teachings of which are incorporated herein by reference. Here, the target is fabricated by plasma spraying $TiO_2$ onto a target base in an atmosphere such as argon which is oxygen deficient and which contains no oxygen-containing compounds. When employed in a magnetron sputtering procedure, this target is able to run at high power levels, leading to the rapid and hence economical deposition of titanium oxide on the glass substrate.

The relative quantities of oxygen and nitrogen or other reactive gas are adjusted so that the film 16 contains a major proportion of the metal oxide and a minor proportion of the other compound sufficient to retard haze formation during heat treatment. It is thought that nitrogen is incorporated interstitially (in grain boundaries) or substitutionally (in titanium oxide crystals) or both, but I do not wish to be bound to such explanation. Preferably, the mole ratio of the different material (nitrogen bound to oxygen and/or titanium, in this example) to the metal oxide (exemplified as titanium oxide) is in the range of about 0.001 to about 0.1. Film 16 may be of any convenient thickness, but preferably has a thickness in the range of about 200 to about 500 Å. Titanium oxide containing a small amount nitrogen and at a thickness of between 275 Å and 450 Å has given good results, with a thickness of 380 Å±50 Å being particularly well suited for some applications.

Contiguous to (that is, touching) the film 16 in FIG. 2 is a film 18 comprising a metal, or a semi-metal such as silicon, the films 16 and 18 forming a contiguous film pair having disparate indices of refraction so as to create a reflective interface 22. Such metals and non-metals tend to be oxidizable, and preferably are selected from the group consisting of silicon, niobium, aluminum, nickel, chromium, and alloys thereof; silicon being particularly preferred, and film 18 preferably has an index of refraction not less than about 1.3 and preferably at least 3.0. Film 18, and the other films contributing to reflectivity, should be of thicknesses exceeding their depletion widths, that is, of sufficient thicknesses so that further thickness increase yields substantially no change in refractive index. Film 18 preferably has a thickness of between 50 Å and 300 Å. The thickness of this layer will depend, at least in part, on the thickness of the lower layers 14 and 16. For instance, if the base film 14 comprises ZnO applied at about 1100 Å and film 16 is about 270 Å of $TiO_2$, silicon at about 50–150 Å has been found to suffice; if the base film 14 is on the order of 1150 Å and the titania in the next layer 16 is decreased to about 230 Å, it is preferred that the silicon in film 18 be increased to 175–275 Å.

Film 20 is a protective overcoat that is preferably but not necessarily contiguous to the film 18 to form a contiguous film pair having disparate refractive indices. The necessary function of film 20 is that it is highly resistant to the permeation through it of oxygen. Film 20 preferably is sufficiently thin, desirably in the range of about 50 to about 150 Å so as to not unduly interfere with the color, transmittance or reflectance of the mirror. Silicon nitride is particularly preferred, and an overcoat film 20 of silicon nitride having a thickness of about 75 Å has given good results. Other materials for the overcoat film 20 include other nitrides and carbides that form oxygen barriers such as silicon carbide. Although, as mentioned, film 20 preferably is contiguous to the film 18, one or more other films, and particularly metals such as titanium, niobium and aluminum, may be sputter deposited between films 18 and 20 that do not adversely affect the properties of the mirror. Moreover, although film 20 is referred to as an overcoat, it will be understood that this refers to its position as being further from the transparent substrate than the film 18. Other and further films, such as silicon carbide, silicon oxide, etc., may be sputter deposited over the film 20 as desired for the purpose of providing protection to the underlying films, to adjust color, etc.

Figure 3:
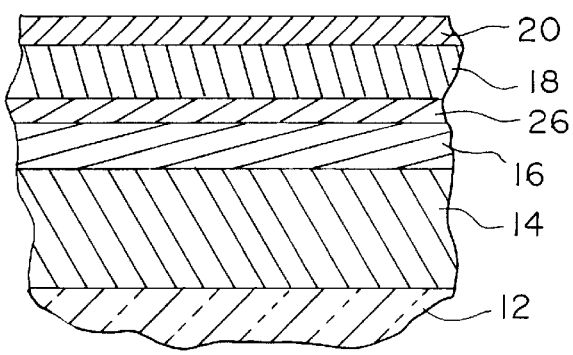
FIG. 3 is a schematic, broken-away view of a dichroic mirror of the invention.

In a preferred embodiment, as illustrated schematically in FIG. 3, an additional film 26 is sputter deposited between the films 16 and 18, the film 26 being a barrier film having high resistance to the permeation through it of oxygen. Film 26 may be of the same materials as the overcoat film 20, and preferably is of silicon nitride. In this embodiment, the film 18 is protectively sandwiched between the barrier films 20 and 26, and thus is further protected from oxygen.

EXPERIMENTAL EXAMPLES

Example 1

Using a commercial magnetron sputtering line manufactured by Airco, Inc., the upper cleaned surfaces of flat glass sheets were exposed to sputtering from various targets in a series of successive zones, the speed of travel of the glass sheets through the successive zones and the electric power delivered to the various magnetron sputtering units in the different zones being such as to provide the desired thicknesses of the sputtered films. A film stack of the type typified in FIG. 2 was generated. Initially, zinc from zinc targets was sputtered onto the glass surface in a oxygen-containing atmosphere to cause deposition of zinc oxide to a thickness of approximately 1095 Å, following which the sheets passed into a zone containing a titanium oxide target having less than a stoichiometric amount of oxygen, as discussed above, this zone containing an atmosphere of nitrogen and oxygen in a mole ratio of 7% nitrogen and 93% oxygen. The resulting film, 270 Å in thickness, thus contained a major proportion of titanium oxide and a minor proportion of nitrogen. Over the thus prepared film was sputtered silicon from a silicon target in an argon atmosphere, to a thickness of 215 Å, and over the silicon layer was sputter deposited an overcoat film of silicon nitride at a thickness of 75 Å using a silicon target in a nitrogen-containing atmosphere.

The resulting mirror was subjected to heat-bending in air, and the following optical properties were measured before and after bending. The transmittance values reported were transmittance to visible light (Illuminant C).

| Property | Before Bend | After Bend |
| --- | --- | --- |
| Reflectance | 58% | 50% |
| Transmittance | 17% | 41% |
| Color: A* | −3.6 | −6.0 |
| B* | +2.5 | +5.0 |
| Haze | 0.35 | 0.40 |

The coated side of the resulting bent mirror exhibited excellent durability. The coating passed the salt spray test of ASTM B117 and Corrodekote test ASTM B380-65. Adhesion of the coating was rated as excellent as the result of several tests, including scoring the coating with a knife into a diamond paftem and attempting to lift off diamond-shaped coating segments with an adhesive tape (3M® #B96), and attempting to rub off the coating with a cloth soaked with isopropanol.

Example 2

The magnetron sputtering procedure of Example 1 was repeated to form on a glass surface a film stack having the following films (from the glass surface outwardly) and thicknesses:

| Film | Thickness, Å |
| --- | --- |
| Zinc Oxide | 1095 |
| Titanium Oxide[1] | 260 |
| Silicon nitride | 60 |
| Silicon | 260 |
| Silicon nitride | 75 |

[1]As in Example 1

The resulting mirror was subjected to heat-bending in air, and the following optical properties were measured before and after bending. The transmittance values reported were transmittance to visible light (Illuminant C).

| Property | Before Bend | After Bend |
| --- | --- | --- |
| Reflectance | 59.2% | 55.6% |
| Transmittance | 17.4% | 38% |
| Color: A* | −2.3 | −6.0 |
| B* | +2.3 | +5.3 |
| Haze | <0.5 | <0.5 |

Properties similar to those of the mirror of Example 1 were obtained.

Example 3

The film stacks of Example 1 and Example 2 have good durability and excellent optical properties, making them commercially acceptable for most applications. It has been discovered, though, that replacing the zinc oxide base film 14 with a base film of silicon nitride yields a surprisingly superior product. In particular, mirrors with a silicon nitride base film are remarkably more durable than the mirrors using zinc oxide as the base film, such as those noted above in Examples 1 and 2, without sacrificing optical properties. To provide an accurate comparison of mirrors according the present invention to directly comparable mirrors with a base film other than silicon nitride, a series of ZnO samples were prepared in much the same fashion outlined above in Example 1 and a comparative series of $Si_3N_4$ samples was prepared in a similar manner, but using a base film of silicon nitride (1100–1400 Å) rather than the zinc oxide base film of Example 1. To enhance conductivity, the silicon nitride film was sputtered using silicon targets doped with 8% aluminum. Silicon targets doped with approximately 4–12% aluminum would likely be acceptable.

One $Si_3N_4$ sample and several of the ZnO samples were subjected to a Copper-Accelerated Acetic Acid Salt Spray (CASS) test. A salt solution was prepared by first dissolving 5 parts by weight sodium chloride in 95 parts by weight distilled water. A sufficient mass of copper (II) chloride dihydrate ($CuCl \cdot 2H_2O$) was dissolved in that salt solution to produce a concentration of about 0.26 g/l, and acetic acid was added to obtain a pH of 3.1 to 3.3. Sheets from each sample were briefly cleaned and placed into a Singleton SCCH #20 Corrosion Cabinet and the salt solution was atomized in the cabinet at about 50° Celsius and allowed to contact the samples. After 120 hours, the samples were removed from the cabinet, rinsed, allowed to dry, and visually inspected.

The $Si_3N_4$ sample was found to have vastly better durability than the ZnO samples. Each ZnO sample exhibited moderate to heavy pitting, while the $Si_3N_4$ sample appeared to be unchanged. The $Si_3N_4$ sample also retained its reflectance better than did the ZnO samples, with the reflectance of the $Si_3N_4$ sample remaining substantially unchanged while all of the ZnO samples exhibited varying drops in reflectance, ranging as high as 0.6%. Thus, the mirror employing silicon nitride as the base layer withstood the CASS test better than did the zinc oxide-based mirrors.

Example 4

Handling each sample with tongs, fresh ZnO samples and a fresh $Si_3N_4$ sample were each dipped in muriatic acid (28% hydrochloric acid, 18 Baume). The samples were visually inspected twice, once after having been submerged for six minutes and once after 15 minutes. After six minutes, each of the ZnO samples exhibited slight to heavy pitting, while the $Si_3N_4$ sample appeared to be unchanged. After 15 minutes, the ZnO samples exhibited moderate to heavy pitting. Surprisingly, the Sample B sheet remained unchanged. In fact, mirrors of employing the silicon nitride base coat remained unchanged even after 96 hours of submersion in muriatic acid. Thus, the silicon nitride-based mirrors withstood attack by a relatively caustic inorganic acid substantially better than did the zinc oxide-based mirrors.

Example 5

The performance of fresh ZnO samples and a fresh $Si_3N_4$ sample in a vinegar dip test was then compared. Using tongs, each sample was submerged in a solution comprising five parts vinegar and 95 parts $H_2O$. Each sample was visually inspected five times—at 15 minutes, 30 minutes, 45 minutes, 60 minutes, and 75 minutes of submersion. After 15 minutes, each of the ZnO samples were unchanged, but some of them began to show slight pitting after 30 minutes. After 45 and 60 minutes, all of the ZnO samples exhibited at least slight pitting and after 75 minutes of submersion in vinegar all of the samples exhibited pitting that ranged between moderate and heavy. Even after having been submerged for 75 minutes, the $Si_3N_4$ sample was unchanged. Amazingly, mirrors of the present invention remained unchanged even after 9 hours of submersion. Thus, the silicon nitride-based mirrors provide substantially improved durability over their zinc oxide-based counterparts.

Example 6

As noted above, the ability to bend coated substrates at elevated temperatures without undue loss of optical quality is very useful in producing curved mirrors. One fresh ZnO sample and one fresh $Si_3N_4$ sample were subjected to heat-bending in air, and the following optical properties were measured before and after bending. The transmittance values reported are transmittance to visible light (Illuminant C).

| Property | Before Bend | After Bend | Before Bend | After Bend |
|---|---|---|---|---|
| Reflectance | 52.5% | 49.7% | 51.6% | 48.7% |
| Transmittance | 41.9% | 39.5% | 34.2% | 36.3% |

-continued

| Property | Before Bend | After Bend | Before Bend | After Bend |
|---|---|---|---|---|
| Color: A* | −5.6 | −5.3 | −4.9 | −5.1 |
| B* | +9.4 | +6.9 | +5.0 | +6.1 |

Both samples exhibited almost identical changes in reflectance upon bending. The reflectance after bending was greater than 45% for both samples. A reflectance of at least 45% is preferred for mirrors of the present invention so objects are clearly seen by the user. A transmittance of at least 24% is preferred for the dichroic mirrors of the invention and both samples surpassed this threshold. The transmittance of the ZnO sample decreased about 2.5% during bending while that of the $Si_3N_4$ sample increased about 2%. The $Si_3N_4$ sample exhibited less of a color change upon bending than did the ZnO sample, with the color B* change for the $Si_3N_4$ sample being less than half that of the ZnO sample.

Thus, optical properties are not sacrificed in achieving the exceptional durability exhibited by mirrors utilizing silicon nitride as the base coat in accordance with the preferred embodiment of the present invention. To the contrary, the change in color during bending in air is actually appreciably reduced. Generally, a smaller shift in color means that the variability of the product with unintended variations in the temperature profile of the bending operation will be smaller. Consequently, the use of silicon nitride as the base coat reduces the likelihood that products will fall outside acceptable color specifications even if the control over heating profiles is not as good as might otherwise be liked. This is a significant benefit which would not have been predicted by one skilled in the field.

The durability of dichroic mirrors having a silicon nitride base film according to a preferred embodiment of this invention is outstanding. The resistance to pitting and the retention of reflectance that such mirrors exhibited upon being subjected to copper-accelerated acetic acid salt spray was excellent. Likewise, these mirrors defied pitting even after incredibly long periods of submersion in muriatic acid. Moreover, upon being submerged in vinegar solution, these mirrors were undamaged many hours after their zinc oxide-based counterparts began to show considerable pitting. The improved durability these mirrors possess would certainly be considered remarkable to those skilled in the relevant art, even when compared to the good durability found in directly comparable mirrors having a base film other than silicon nitride. Surprisingly, these mirrors achieve great strides in durability without unduly sacrificing optical quality. Like their zinc oxide-based counterparts, these silicon nitride-based mirrors offer excellent optical properties, even after being bent at greatly elevated temperatures. After bending, mirrors of the present invention preferably exhibit a reflectance of at least 45% and a transmittance of at least 24%. Both thresholds are exceeded by silicon nitride-based mirrors formed in accordance with this invention. Thus, dichroic mirrors having a silicon nitride base film in accordance with a preferred embodiment of the present invention yield surprisingly remarkable durability and optical performance.

While a preferred embodiment of the present invention has been described, it should be understood that various changes, adaptations and modifications may be made therein without departing from the spirit of the invention and the scope of the appended claims.

What is claimed is:

1. A heat-treatable dichroic mirror, comprising:
   a) a transparent substrate having a glass transition temperature in the range of 650–800° C.;
   b) a sputtered silicon nitride base film carried on said substrate and contiguous thereto;
   c) a plurality of sputtered films carried on said substrate and forming at least two pairs of contiguous films, the films of each pair having disparate refractive indices differing by at least about 0.2 so as to provide between them a reflective interface, the films including a first film that is a member of a said contiguous film pair and comprising an oxide of a metal, a second film positioned further from the substrate than the first film and that is a member of a said contiguous film pair, the second film comprising an oxidizable metal or semimetal, and a protective overcoat of a thickness and composition sufficient to substantially prevent permeation of oxygen therethrough when heat treated at said glass transition temperature, said mirror, after said heat treatment, exhibiting a transmittance of at least 24% in the wavelength range of 550–650 nm, a reflectance of at least 45%.

2. The mirror of claim 1 wherein said first film comprises an oxide of a metal selected from the group consisting of titanium, zinc, niobium, tin, bismuth, and alloys thereof.

3. The mirror of claim 1 wherein said second film is selected from the group consisting of silicon, niobium, aluminum, nickel, chromium, and alloys thereof.

4. The mirror of claim 1 wherein said first and second films are members of the same film pair having disparate refractive indices.

5. The mirror of claim 1 including a third film deposited between the first and second films and forming with at least one of the first and second films a film pair having disparate refractive indices, said third film being of a thickness and composition sufficient to substantially prevent permeation of oxygen therethrough when the mirror is heat treated at said glass transition temperature.

6. The mirror of claim 5 wherein said third film forms with each of the first and second films a film pair having disparate refractive indices.

7. The mirror of claim 5 or claim 6 wherein said second film forms with each of said second film and said protective overcoat a film pair having disparate refractive indices.

8. The mirror of claim 1 wherein said first film includes an impurity in an amount sufficient to retard haze formation in said first film upon said heat treatment, the mole ratio of said impurity to said metal oxide not exceeding 0.1.

9. The mirror of claim 8 wherein said impurity comprises nitrogen.

10. A heat-treatable dichroic mirror, comprising:
    a) a transparent substrate having a glass transition temperature in the range of 650–800° C.;
    b) a sputtered silicon nitride base film carried on said substrate and contiguous thereto;
    c) a plurality of sputtered films carried on said substrate and forming at least two pairs of contiguous films, the films of each pair having disparate refractive indices differing by at least about 0.2 so as to provide between them a reflective interface, the films including a first film that is a member of a said contiguous film pair and comprising an oxide of titanium, a second film positioned further from the substrate than the first film and that is a member of a said contiguous film pair, the second film comprising silicon, and a protective overcoat of a thickness and composition sufficient to substantially prevent permeation of oxygen therethrough when heat treated at said glass transition temperature, said titanium oxide first film including an impurity deposited therein during formation of said first film and in an amount sufficient to retard haze formation in said first contiguous film upon said heat treatment, the mole ratio of said impurity to said titanium oxide not exceeding 0.1.

11. The mirror of any one of claims 1–10 wherein said overcoat film is silicon nitride.

12. A heat-treatable dichroic mirror, comprising:
    a) a transparent substrate having a glass transition temperature in the range of 650–800° C.;
    b) a sputtered silicon nitride base film carried on said substrate and contiguous thereto;
    c) a plurality of films carried on said substrate carried on said substrate and forming at least two pairs of contiguous films, the films of each pair having disparate refractive indices differing by at least about 0.2 so as to provide between them a reflective interface, the films including a first film that is a member of a said contiguous film pair and comprising an oxide of a metal selected from the group consisting of titanium, zinc, niobium, tin, bismuth and alloys thereof, a second film positioned further from the substrate than the first film and that is a member of a said contiguous film pair, the second film comprising an oxidizable element selected from the group consisting of silicon, niobium, aluminum, nickel, chromium, and alloys thereof, and a protective overcoat of silicon nitride of a thickness and composition sufficient to substantially prevent permeation of oxygen therethrough when said mirror is heat treated at said glass transition temperature, said mirror, after said heat treatment, exhibiting a transmittance of at least 24%, a reflectance of at least 45%.

13. The mirror of claim 12 wherein said first film includes an impurity deposited therein during formation of said first film and in an amount sufficient to retard haze formation in said first contiguous film upon said heat treatment, the mole ratio of said impurity to said metal oxide not exceeding 0.1.

14. The mirror of claim 13 wherein said impurity is nitrogen.

15. Method of making a dichroic mirror comprising magnetron sputter coating upon a transparent substrate having a glass transition temperature in the range of 650–800° C. a silicon nitride base film contiguous to said substrate and a plurality of sequential films forming at least two pairs of contiguous films, the films of each pair having disparate refractive indices differing by at least about 0.2 so as to provide between them a reflective interface, the films including a first film, the coating further including a protective overcoat of a thickness and composition sufficient to substantially prevent permeation of oxygen therethrough when said mirror is heat treated at said glass transition temperature, the method including the step of incorporating in said first metal oxide film an impurity at a mole ratio of said impurity to said metal oxide in the range of 0.001 to 0.1.

16. The method of claim 15 including the step of sputter-coating said metal oxide film in an atmosphere containing said impurity.

17. The method of claim 16 including the step of sputter-coating said metal oxide film in an atmosphere containing oxygen and nitrogen.

18. The method of claim 13 wherein said metal oxide is titanium oxide.

19. The method of any one of claims 14–18 wherein said metal oxide film is sputtered from a target comprising titanium oxide having a substoichiometric amount of oxygen.

* * * * *